(12) United States Patent
Suwano et al.

(10) Patent No.: US 11,027,225 B2
(45) Date of Patent: Jun. 8, 2021

(54) WASTE LIQUID TREATING APPARATUS

(71) Applicant: DISCO CORPORATION, Tokyo (JP)

(72) Inventors: Jun Suwano, Tokyo (JP); Takeshi Furonaka, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 16/857,443

(22) Filed: Apr. 24, 2020

(65) Prior Publication Data

US 2020/0338478 A1 Oct. 29, 2020

(30) Foreign Application Priority Data

Apr. 26, 2019 (JP) .............................. JP2019-085351

(51) Int. Cl.
*B01D 21/02* (2006.01)
*B01D 21/00* (2006.01)
*B01D 21/24* (2006.01)

(52) U.S. Cl.
CPC ..... *B01D 21/0033* (2013.01); *B01D 21/0066* (2013.01); *B01D 21/02* (2013.01); *B01D 21/2483* (2013.01)

(58) Field of Classification Search
CPC .............. B01D 21/003; B01D 21/0033; B01D 21/0066; B01D 21/2483
USPC ............................. 210/521, 532.1, 801, 803
See application file for complete search history.

(56) References Cited

U.S. PATENT DOCUMENTS

| 3,460,677 | A | * | 8/1969 | Fifer | C02F 3/02 210/521 |
| 4,268,392 | A | * | 5/1981 | Hayes | E03C 1/264 210/532.1 |
| 5,314,617 | A | * | 5/1994 | Karterman | E02B 15/046 210/521 |
| 5,458,770 | A | * | 10/1995 | Fentz | B01D 17/0211 210/521 |
| 7,438,803 | B1 | * | 10/2008 | Allen | B01D 21/0066 210/521 |
| 8,839,963 | B2 | * | 9/2014 | Torres-Collazo | B01D 21/003 210/521 |
| 8,865,006 | B2 | * | 10/2014 | Ford | B01D 21/0033 210/801 |
| 2009/0184049 | A1 | * | 7/2009 | Murray | B01D 21/0006 210/521 |
| 2010/0213119 | A1 | * | 8/2010 | Generes | B01D 21/003 210/521 |

FOREIGN PATENT DOCUMENTS

JP 2004230527 A 8/2004
JP 2011235260 A 11/2011

* cited by examiner

*Primary Examiner* — Christopher Upton
(74) *Attorney, Agent, or Firm* — Greer, Burns & Crain, Ltd.

(57) ABSTRACT

A sedimenting assembly for sedimenting debris contained in a processed waste liquid in a sedimentation tank includes a plurality of partition plates extending vertically across a direction in which the processed waste liquid flows and disposed at spaced intervals in the direction, thereby defining a zigzag channel through which the processed waste liquid flows horizontally. The zigzag channel ensures a time during which to sediment the debris against a time during which the processed waste liquid flows through the zigzag channel, allowing the debris to settle reliably.

8 Claims, 5 Drawing Sheets

WASTE LIQUID TREATING APPARATUS

BACKGROUND OF THE INVENTION

Field of the Invention

The present invention relates to a waste liquid treating apparatus for removing debris contained in a processed waste liquid discharged from a processing apparatus.

Description of the Related Art

As disclosed in JP 2004-230527A and JP 2011-235260A, for example, when unwanted debris is to be removed from a liquid, the liquid is guided to pass through a vertically zigzag channel in a sedimentation tank and hence to flow upwardly and downwardly repeatedly, thereby allowing the debris to settle as a sediment to be removed.

SUMMARY OF THE INVENTION

However, it is difficult for the sedimentation tank with the vertically zigzag channel therein to allow the debris to settle effectively as a sediment because the liquid tends to fling up the sediment while flowing through the vertically zigzag channel.

It is therefore an object of the present invention to provide a waste liquid treating apparatus for sedimenting debris effectively in a sedimentation tank.

In accordance with an aspect of the present invention, there is provided a waste liquid treating apparatus for removing debris from a processed waste liquid discharged from a processing apparatus, including a sedimentation tank having side plates and a bottom plate interconnecting lower ends of the side plates, an inlet joined to one of the side plates, for introducing the processed waste liquid into the sedimentation tank, an outlet joined to another one of the side plates in confronting relation to the inlet, for discharging the processed waste liquid from the sedimentation tank, and sedimenting means disposed between the inlet and the outlet, for sedimenting debris contained in the processed waste liquid, in which the sedimenting means includes a plurality of partition plates extending vertically across a direction from the inlet to the outlet and disposed at spaced intervals in the direction, thereby defining a zigzag channel through which the processed waste liquid flows horizontally.

Preferably, the sedimenting means includes boxes that can be inserted into and removed from the sedimentation box, each of the boxes including a pair of second side plates that face each other and a second bottom plate interconnecting lower ends of the second side plates, in which by taking a selected one of the boxes from the sedimentation tank, debris sedimented in the selected one of the boxes can be removed from the sedimentation tank.

According to the present invention, the zigzag channel extends horizontally to ensure a time during which to sediment the debris against a time during which the processed waste liquid flows through the zigzag channel. While the debris is flowing through the zigzag channel, the debris flows parabolically and settles onto the bottom plate of the sedimentation tank. Therefore, the debris is allowed to settle reliably.

Furthermore, since the debris settles as a sediment on the bottom plate of the sedimentation tank, the sediment needs to be removed from the sedimentation tank. In the case where the zigzag channel is defined by the boxes, the sediment can be removed from the sedimentation tank simply by taking the boxes from the sedimentation tank. Accordingly, burdens on the worker who handles the waste water treating apparatus are reduced.

The above and other objects, features and advantages of the present invention and the manner of realizing them will become more apparent, and the invention itself will best be understood from a study of the following description and appended claims with reference to the attached drawings showing preferred embodiments of the present invention.

DETAILED DESCRIPTION OF THE PREFERRED EMBODIMENTS

1. First Embodiment

Figure 1:
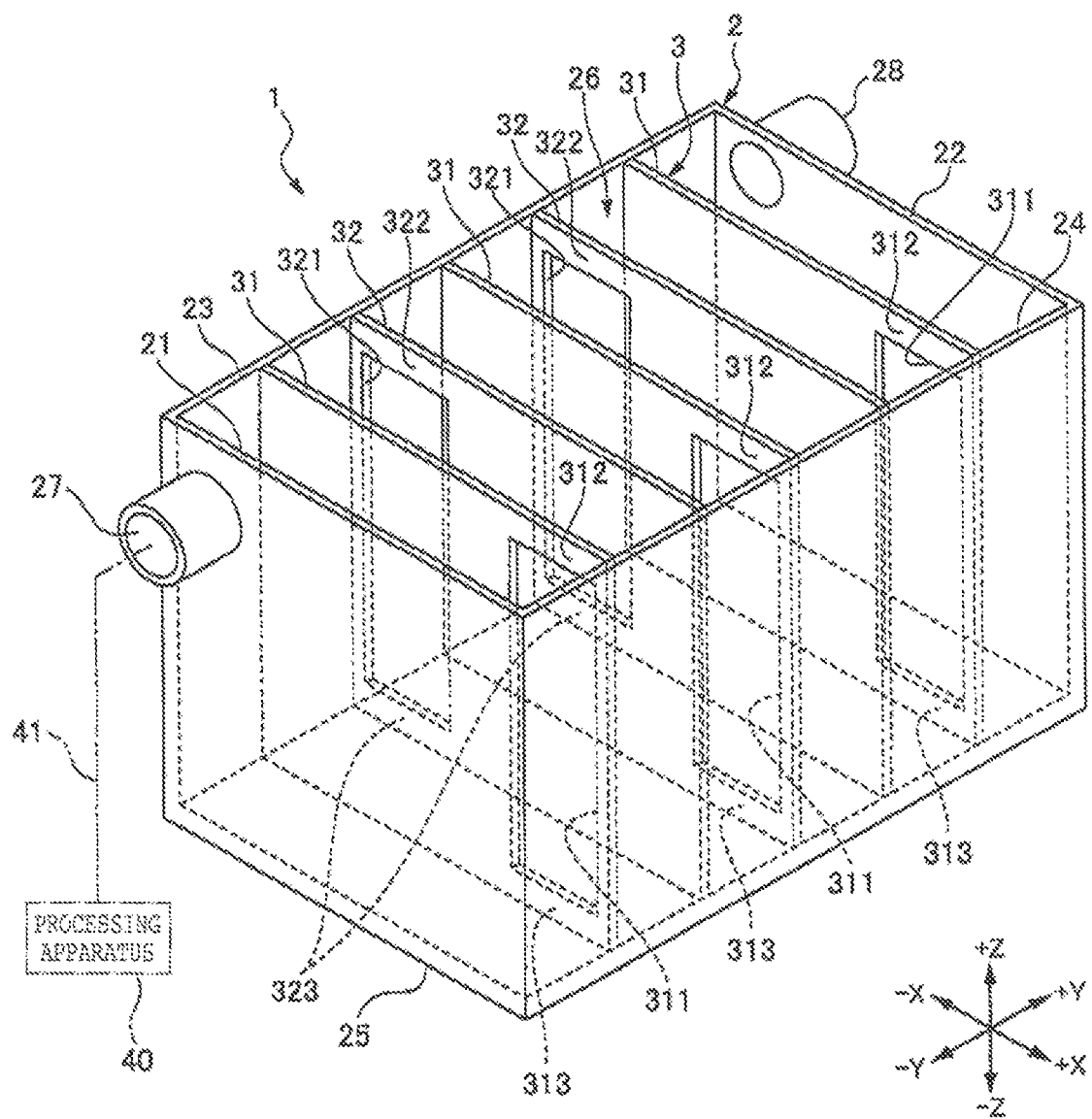
FIG. 1 is a perspective view of a waste liquid treating apparatus according to a first embodiment of the present invention.

A waste liquid treating apparatus 1, illustrated in FIG. 1, according to a first embodiment of the present invention is an apparatus for receiving a processed waste liquid containing debris discharged from a processing apparatus 40 that processes a workpiece by supplying a processing fluid thereto, allowing the debris to settle, and removing the sedimented debris from the received waste liquid.

As illustrated in FIG. 1, the waste liquid treating apparatus 1 includes a sedimentation tank 2 that is of a box shape having four side plates 21, 22, 23, and 24 and a bottom plate 25 interconnecting the lower ends of the side plates 21, 22, 23, and 24, with an upper opening 26 being open opposite the bottom plate 25, an inlet 27 joined to the side plate 21 at an end of the sedimentation tank 2, for introducing a waste liquid into the sedimentation tank 2, an outlet 28 joined to the side plate 22 at the other end of the sedimentation tank 2 in confronting relation to the side plate 21, for discharging the waste liquid from the sedimentation tank 2, and sedimenting means or assembly 3 disposed between the inlet 27 and the outlet 28, for sedimenting the debris contained in the waste liquid. Directions to be referred to with respect to the waste liquid treating apparatus 1 are defined as follows. Directions interconnecting the inlet 27 and the outlet 28 are defined as Y directions including a +Y direction and a −Y direction. Directions perpendicular to the Y directions are defined as X directions including a +X direction and a −X direction. Directions perpendicular to the X directions and the Y directions are defined as Z directions including a +Z direction and a −Z direction.

The inlet 27 is connected to the processing apparatus 40 by a pipe 41. A processing liquid that has been used in the processing apparatus 40 flows as a waste liquid containing debris through the pipe 41 into the inlet 27.

The sedimenting means 3 includes a plurality of partition plates 31 and 32 arrayed in the Y directions. The partition plates 31 and 32 extend vertically between the side plates 23 and 24 across the Y directions between the inlet 27 and the outlet 28. The partition plates 31 and 32 have respective through holes 311 and 321 defined therein that extend in thicknesswise directions, i.e., the Y directions, therethrough. Specifically, the through holes 311 are defined in the partition plates 31 at end portions thereof in the +X direction. The through holes 321 are defined in the partition plates 32 at end portions thereof in the −X direction.

The partition plates 31 and the partition plates 32 are disposed alternately at predetermined spaced intervals in the Y directions. Since the through holes 311 defined in the partition plates 31 and the through holes 321 defined in the partition plates 32 are disposed in different positions in the X directions, the through holes 311 and the through holes 321 are not aligned with each other, but staggered from each other, in the Y directions. Though the through holes 311 and 321 are rectangular in shape as illustrated in FIG. 1, they are not limited to the rectangular shape.

The partition plates 31 include respective upper solid portions 312, which are free of through holes, above the through holes 311, and also include respective lower solid portions 313, which are free of through holes, below the through holes 311. The partition plates 32 include respective upper solid portions 322, which are free of through holes, above the through holes 321, and also include respective lower solid portions 323, which are free of through holes, below the through holes 321.

The partition plates 31 and 32 can be inserted into and removed from the sedimentation tank 2 through the upper opening 26 thereof. Though not illustrated, the side plates 23 and 24 that face each other in the X directions have guide grooves defined respectively inner surfaces thereof for guiding the partition plates 31 and 32 as they are inserted into and removed from the sedimentation tank 2.

Figure 2:
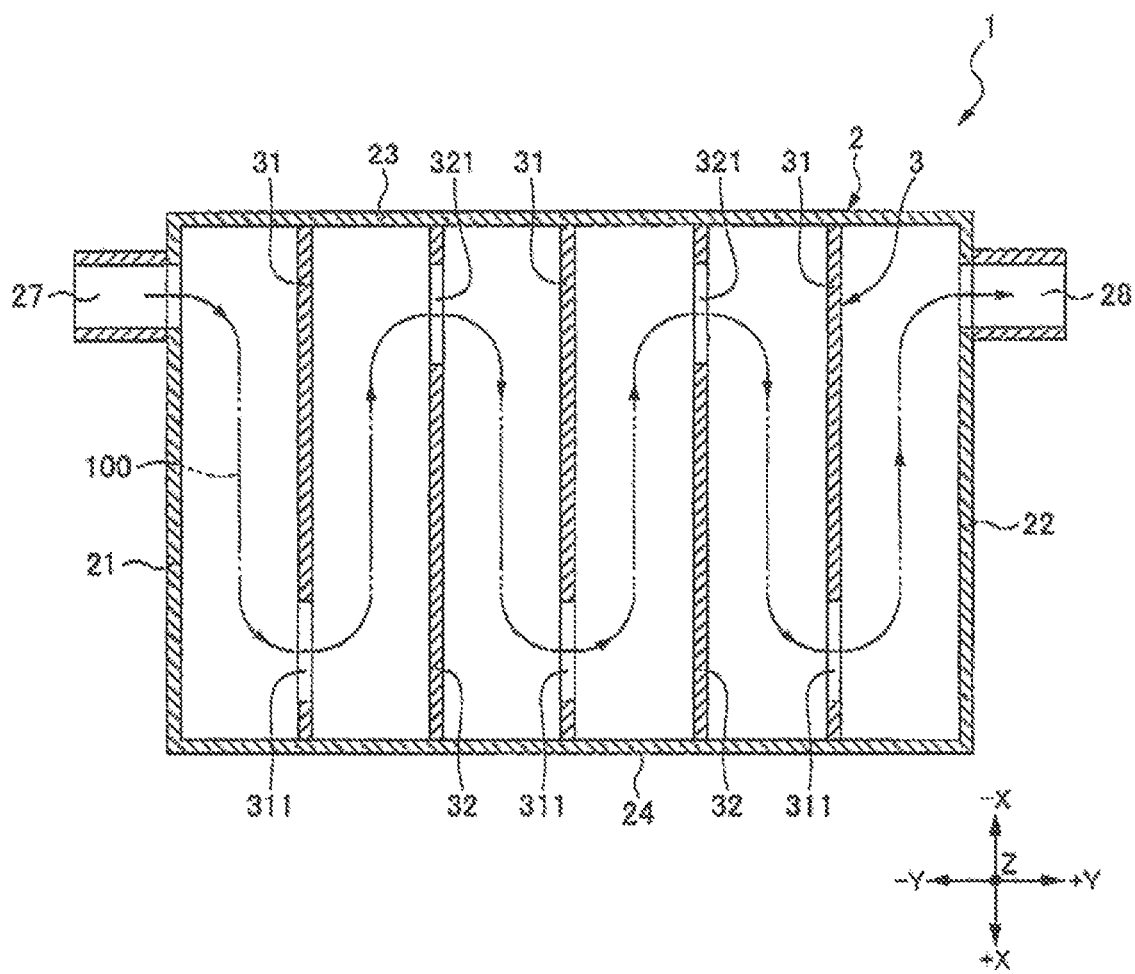
FIG. 2 is a horizontal cross-sectional view of the waste liquid treating apparatus according to the first embodiment.

As illustrated in FIG. 2, a waste liquid 100 discharged from the processing apparatus 40 into the pipe 41 flows through the inlet 27 into the sedimentation tank 2. The waste liquid 100 introduced into the sedimentation tank 2 flows in a space between the side plate 21 and the next partition plate 31 in the +X direction. The waste liquid 100 then turns into the +Y direction near the side plate 24, and flows through the through hole 311 in the partition plate 31 into a space between the partition plate 31 and the next partition plate 32. At this time, since the upper solid portion 312 of the partition plate 31 illustrated in FIG. 1 is present above the through hole 311, debris suspended in the waste liquid 100 near the surface of the waste liquid 100 is blocked by the upper solid portion 312. Similarly, since the lower solid portion 313 of the partition plate 31 illustrated in FIG. 1 is present below the through hole 311, debris suspended in the waste liquid 100 near the bottom plate 25 is blocked by the lower solid portion 313.

The waste liquid 100 that has passed through the through hole 311 flows the space between the partition plate 31 and the next partition plate 32 in the −X direction. The waste liquid 100 then turns into the +Y direction near the side plate 23, and flows through the through hole 321 in the partition plate 32 into a space between the partition plate 32 and the next partition plate 31. At this time, since the upper solid portion 322 of the partition plate 32 illustrated in FIG. 1 is present above the through hole 321, debris suspended in the waste liquid 100 near the surface of the waste liquid 100 is blocked by the upper solid portion 322. Similarly, since the lower solid portion 323 of the partition plate 32 illustrated in FIG. 1 is present below the through hole 321, debris suspended in the waste liquid 100 near the bottom plate 25 is blocked by the lower solid portion 323.

Thereafter, the waste liquid 100 similarly flows in a horizontally zigzag channel, changing its direction alternately to the X directions and the Y directions, in spaces defined between the partition plates 31 and 32 and the side plates 23, 24, and 22. While the waste liquid 100 is thus flowing in the horizontally zigzag channel through the sedimentation tank 2, debris contained in the waste liquid 100 falls parabolically and settles onto the bottom plate 25 of the sedimentation tank 2. The debris contained in the waste liquid 100 is thus sedimented more reliably than if it flows in a vertically zigzag channel. Furthermore, when the waste liquid 100 flows into the through holes 311 and 321, the waste liquid 100 changes its direction and hence flows at a reduced speed, making it easier for the debris to settle in the sedimentation tank 2.

The partition plates 31 and 32 include the respective upper solid portions 312 and 322 that are effective to block the flow of debris suspended in the waste liquid 100 near its surface. In addition, the partition plates 31 and 32 include the respective lower solid portions 313 and 323 that are effective to block the flow of debris suspended in the waste liquid 100 near the bottom plate 25 but not fully sinking.

By flowing in the horizontally zigzag pattern through the sedimentation tank 2, the waste liquid 100 turns into filtered water from which the debris has been removed, and the filtered water flows out of the outlet 28. The filtered water from the outlet 28 is supplied through a pipe to the processing apparatus 40 where it is reused as a processing liquid.

2. Second Embodiment

Figure 3:
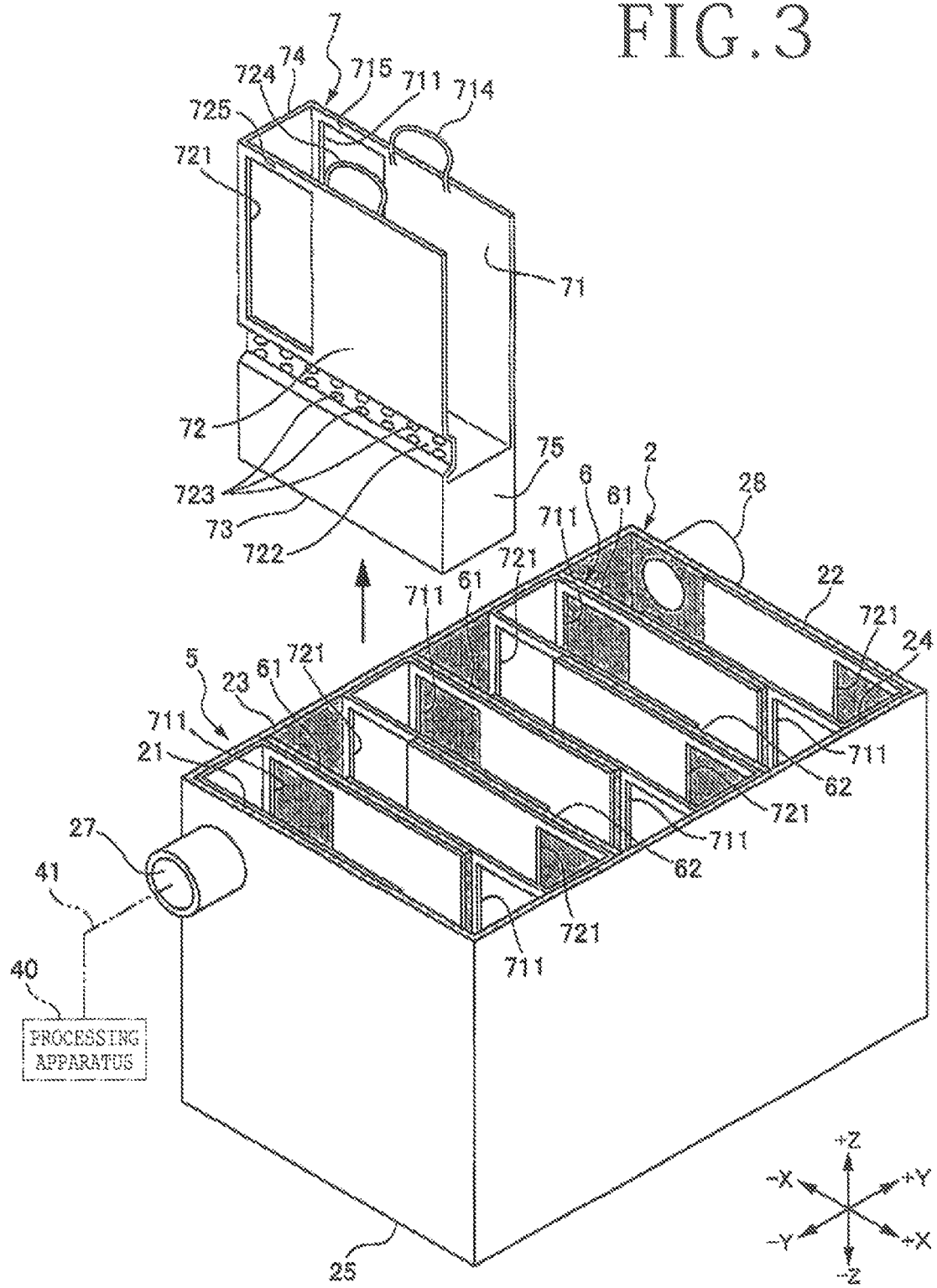
FIG. 3 is a perspective view of a waste liquid treating apparatus according to a second embodiment of the present invention.

A waste liquid treating apparatus 5, illustrated in FIG. 3, according to a second embodiment of the present invention is an apparatus for receiving a waste liquid containing debris discharged from a processing apparatus 40 that processes a workpiece by supplying a processing fluid thereto, allowing the debris to settle, and removing the sedimented debris from the received waste liquid, as with the waste liquid treating apparatus 1 illustrated in FIG. 1.

As illustrated in FIG. 3, the waste liquid treating apparatus 5 includes a sedimentation tank 2 that is of a box shape having four side plates 21, 22, 23, and 24 and a bottom plate 25 interconnecting the lower ends of the side plates 21, 22, 23, and 24, with an upper opening 26 being open opposite the bottom plate 25, an inlet 27 joined to the side plate 21 at an end of the sedimentation tank 2, for introducing a waste liquid into the sedimentation tank 2, an outlet 28 joined to the side plate 22 at the other end of the sedimentation tank 2 in confronting relation to the side plate 21, for discharging the waste liquid from the sedimentation tank 2, and sedimenting means 6 disposed between the inlet 27 and the outlet 28, for sedimenting the debris contained in the waste liquid. Directions to be referred to with respect to the waste liquid treating apparatus 5 are defined as follows. Directions interconnecting the inlet 27 and the outlet 28 are defined as Y directions including a +Y direction and a −Y direction. Directions perpendicular to the Y directions are defined as X directions including a +X direction and a −X direction. Directions perpendicular to the X directions and the Y directions are defined as Z directions including a +Z direction and a −Z direction.

The inlet 27 is connected to the processing apparatus 40 by a pipe 41. A processing liquid that has been used in the processing apparatus 40 flows as a waste liquid containing debris through the pipe 41 into the inlet 27.

Figure 4:
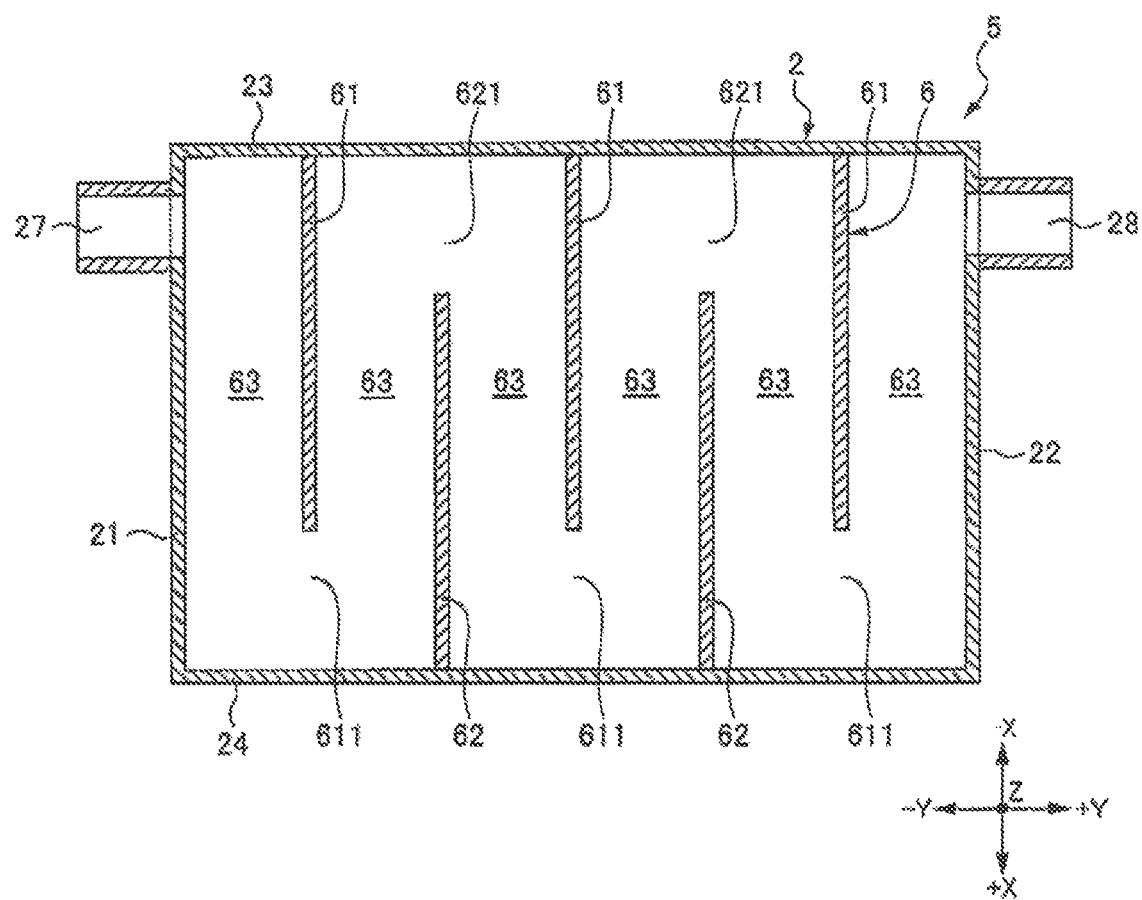
FIG. 4 is a horizontal cross-sectional view of a sedimentation tank and partition plates of the waste liquid treating apparatus according to the second embodiment.

The sedimenting means 6 includes a plurality of partition plates 61 and 62 arrayed in the Y directions. As illustrated in FIGS. 3 and 4, the partition plates 61 have ends in the −X direction that are connected to an inner surface of the side plate 23 and ends in the +X direction that are not connected to an inner surface of the side plate 24, with openings 611 (see FIG. 4) defined between the ends of the partition plates 61 in the +X direction and the inner surface of the side plate 24. The partition plates 62 have ends in the +X direction that are connected to the inner surface of the side plate 24 and ends in the −X direction that are not connected to the inner surface of the side plate 23, with openings 621 (see FIG. 4) defined between the ends of the partition plates 62 in the −X direction and the inner surface of the side plate 23.

The partition plates 61 and the partition plates 62 are disposed alternately at predetermined spaced intervals in the Y directions. Since the openings 611 defined by the partition plates 61 and the openings 621 defined by the partition plates 62 are disposed in different positions in the X directions, the openings 611 and the openings 621 are not aligned with each other, but staggered from each other, in the Y directions. The openings 611 and 621 are not limited to any particular shape and size.

As illustrated in FIG. 4, spaces 63 having a predetermined width are defined between the side plate 21 and the next partition plate 61, between the partition plates 61 and the partition plates 62, and between the side plate 22 and the next partition plate 61. Boxes 7 illustrated in FIG. 3 are removably housed in the respective spaces 63.

The boxes 7 can be inserted into and removed from the sedimentation tank 2. Each of the boxes 7 includes a pair of second side plates 71 and 72 that face each other, a second bottom plate 73 interconnecting the lower end of the second side plate 71 and the lower end of the second side plate 72, a third side plate 74 interconnecting a side end of the second side plate 71 and a side end of the second side plate 72, and a fourth side plate 75 interconnecting another side end of the second side plate 71 and another side end of the second side plate 72.

The second side plates 71 and 72 have horizontal lengths approximately equal to the horizontal lengths of the partition plates 61 and 62 in the X directions. The second side plates 71 and 72 have vertical heights approximately equal to the vertical heights of the partition plates 61 and 62 in the Z directions.

The first side plate 71 has a through window 711 defined therein that extends in thicknesswise directions, i.e., the Y directions, therethrough, near the third side plate 74. The second side plate 72 also has a through window 721 defined therein that extends in thicknesswise directions, i.e., the Y directions, therethrough, near the third side plate 74. The through windows 711 and 721 have horizontal widths equal to or smaller than the horizontal widths of the openings 611 and 621. The side plates 71 and 72 include respective upper solid portions 715 and 725, which are free of through windows, above the through windows 711 and 721.

The third side plate 74 fully closes the space between the side end of the second side plate 71 and the side end of the second side plate 72. The fourth side plate 75 closes only a lower portion of the space between the other side end of the second side plate 71 and the other side end of the second side plate 72. In other words, an upper portion of the space between the other side end of the second side plate 71 and the other side end of the second side plate 72 is open.

The second side plate 72 has a dented portion 722 defined in a lower portion thereof and recesses toward the second side plate 71. The dented portion 722 has a plurality of holes 723 defined therein that extend in thicknesswise directions therethrough. The dented portion 722 is made of perforated metal, for example. A handle 714 is coupled to an upper portion of the second side plate 71. A handle 724 is coupled to an upper portion of the second side plate 72.

Figure 5:
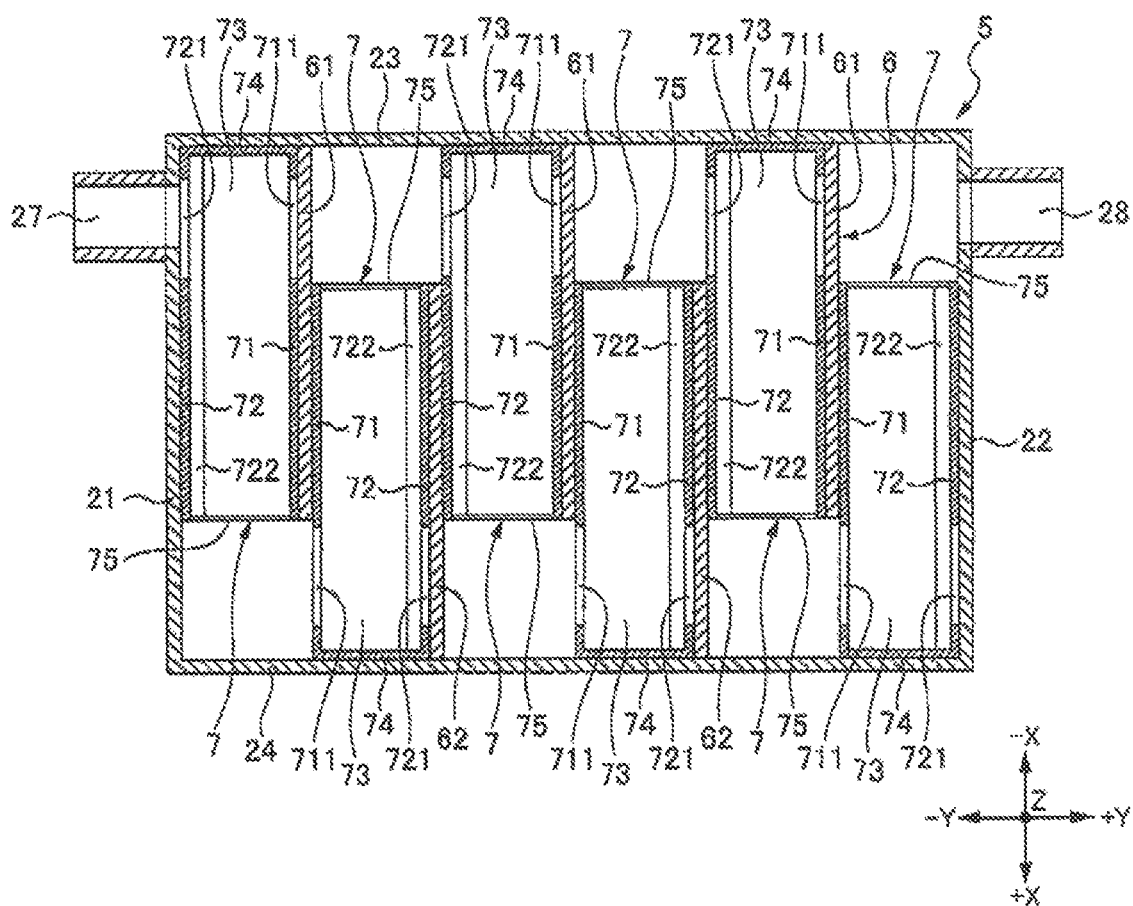
FIG. 5 is a horizontal cross-sectional view of the waste liquid treating apparatus according to the second embodiment.

As illustrated in FIGS. 3 and 5, one of the boxes 7 is inserted in the endmost space 63 in the −Y direction with the third side plate 74 held in intimate contact with an inner surface of the side plate 23. Therefore, the box 7 is not present in a +X direction side of the space 63 and hence does not close the opening 611 between the adjacent partition plate 61 and the side plate 24. The end of the box 7 in the +X direction is open above the fourth side plate 75. In FIG. 3, the side plates 21, 22, 23, and 24 and the partition plates 61 and 62 are illustrated by hatching to distinguish themselves from the second side plates 71 and 72 and the third side plates 74 of the boxes 7.

Another one of the boxes 7 is inserted in the next space 63 between the partition plate 61 and the next partition plate 62 with the third side plate 74 held in intimate contact with an inner surface of the side plate 24. Therefore, the box 7 is not present in a −X direction side of the space 63 and hence does not close the opening 621 between the partition plate 62 and the side plate 23. The end of the box 7 in the −X direction is open above the fourth side plate 75.

Still another one of the boxes 7 is inserted in the next space 63 between the partition plate 62 and the next partition plate 61 with the third side plate 74 held in intimate contact with the side plate 23. Therefore, the box 7 is not present in a +X direction side of the space 63 and hence does not close the opening 611 between the partition plate 61 and the side plate 24. The end of the box 7 in the +X direction is open above the fourth side plate 75.

The remaining boxes 7 are inserted in the remaining spaces 63 between the partition plates 61 and 62 and the side plate 22 in respective positions alternately shifted in the X directions, as illustrated in FIG. 5.

Consequently, adjacent ones of the boxes 7 are inserted in the corresponding spaces 63 in mutually opposite orientations. As illustrated in FIGS. 3 and 5, therefore, the through windows 711 and 721 in those adjacent ones of the boxes 7 do not face each other in the Y directions. The third side plates 74 of the adjacent ones of the boxes 7 are alternately held in intimate contact with the inner surfaces of the side plates 23 and 24. The through windows 711 in the second side plates 71 of the boxes 7 whose third side plates 74 are held in intimate contact with the inner surface of the side plate 24 are aligned with the openings 611, whereas the through windows 712 in the second side plates 72 of the boxes 7 whose third side plates 74 are held in intimate contact with the inner surface of the side plate 23 are aligned with the openings 621. Therefore, the second side plates 71 and 72 of the boxes 7 do not close the openings 611 and 621. The waste liquid introduced from the inlet 27 into the sedimentation tank 2 flows through the through windows 711 and 712 in a horizontally zigzag channel, changing its direction alternately to the X directions and the Y directions, as with the waste liquid in the waste liquid treating apparatus 1 according to the first embodiment.

While the waste liquid is thus flowing in the horizontally zigzag channel through the sedimentation tank 2, debris contained in the waste liquid falls parabolically and settles onto the second bottom plates 73 of the boxes 7. The debris contained in the waste liquid is thus sedimented more reliably than if it flows in a vertically zigzag channel. Furthermore, when the waste liquid flows into the through windows 711 and 721, the waste liquid changes its direction and hence flows at a reduced speed, making it easier for the debris to settle in the boxes 7.

The upper solid portions 715 and 716 of the partition plates 61 and 62 are effective to block the flow of debris suspended in the waste liquid near its surface. Debris suspended in a lower region of the waste liquid is trapped in spaces surrounded by the second side plates 71 and 72, the second bottom plates 73, the third side plates 74, and the fourth side plates 75 of the boxes 7.

When the debris contained in the waste liquid is sedimented in the boxes 7, the worker grips and lifts the handles 714 and 724 of the boxes 7 (see FIG. 3) thereby to remove the boxes 7 from the sedimentation tank 2. In this manner, the sedimented debris can be removed from the sedimentation tank 2.

When the boxes 7 are lifted out of the sedimentation tank 2, the waste liquid left in the boxes 7 flows out of the holes 723 defined in the dented portions 722. Therefore, any remaining waste liquid in the boxes 7 is minimized. Physical burdens imposed on the worker in removing the sediment from the sedimentation tank 2 are thus reduced.

When the worker has taken some boxes 7 from the sedimentation tank 2, the worker may leave the remaining boxes 7 held in the sedimentation tank 2 to keep the sediment in the remaining boxes 7. Therefore, while the sediment is being removed from the boxes 7 taken from the sedimentation tank 2, the waste liquid can continuously be introduced from the inlet 27 into the sedimentation tank 2.

In as much as the worker can select and take any one of the boxes 7 from the sedimentation tank 2, the worker may remove only those boxes 7 which have trapped more debris from the sedimentation tank 2. Particularly, more sediment tends to be trapped in the vicinity of the inlet 27 with less sediment in the vicinity of the outlet 28. The worker can thus take the box 7 that is closest to the inlet 27 out of the sedimentation tank 2 and remove the debris from the box 7 while allowing the waste liquid to flow continuously into the sedimentation tank 2 without removing all the debris sedimented in the sedimentation tank 2.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A waste liquid treating apparatus for removing debris from a processed waste liquid discharged from a processing apparatus, the apparatus comprising:
a sedimentation tank having side plates and a bottom plate interconnecting lower ends of the side plates;
an inlet joined to one of the side plates, for introducing the processed waste liquid into the sedimentation tank;
an outlet joined to another one of the side plates in confronting relation to the inlet, for discharging the processed waste liquid from the sedimentation tank; and
sedimenting means disposed between the inlet and the outlet, for sedimenting debris contained in the processed waste liquid,
wherein the sedimenting means includes a plurality of partition plates extending vertically across a direction from the inlet to the outlet and disposed at spaced intervals in the direction, the partition plates each including a through-hole, each of the through-holes on the partition plates being spaced from the side plates and the bottom plate of the sedimentation tank, wherein the through-holes on adjacent plates are at different positions such that the through-holes collectively define a zigzag channel through which the processed waste liquid flows horizontally.

2. The waste liquid treating apparatus according to claim 1, wherein the sedimenting means includes boxes that can be inserted into the sedimentation box between the partition plates, and removed from the sedimentation box, each of the boxes including a pair of second side plates that face each other and a second bottom plate interconnecting lower ends of the second side plates, the second side plates of each of the boxes include windows, wherein one of the windows of each of the boxes is aligned with one of the through holes of the partition plates such that the windows of the boxes and the through holes of the partition plates collectively define the zig zag pattern, and by removing a selected one of the boxes from the sedimentation tank, debris sedimented in the selected one of the boxes is removed from the sedimentation tank.

3. The waste liquid treating apparatus according to claim 2, wherein at least one of the second side plates of each of the boxes includes a dented portion having a plurality of holes.

4. The waste liquid treating apparatus according to claim 2, wherein at least one of the second side plates of each of the boxes includes a dented portion made with a perforated metal defining a plurality of holes.

5. The waste liquid treating apparatus according to claim 2, wherein the second side plates of each of the boxes include handles.

6. The waste liquid treating apparatus according to claim 2, wherein the windows on the second side plates of each of the boxes are aligned with each other.

7. The waste liquid treating apparatus according to claim 2, wherein the second side plates of each of the boxes are parallel to each other.

8. The waste liquid treating apparatus according to claim 2, wherein the through-holes on the second side plates of each of the boxes are parallel to each other.

* * * * *